Sept. 23, 1952     F. T. STOCKTON     2,611,211
FISHING FLOAT
Filed May 17, 1948     2 SHEETS—SHEET 1
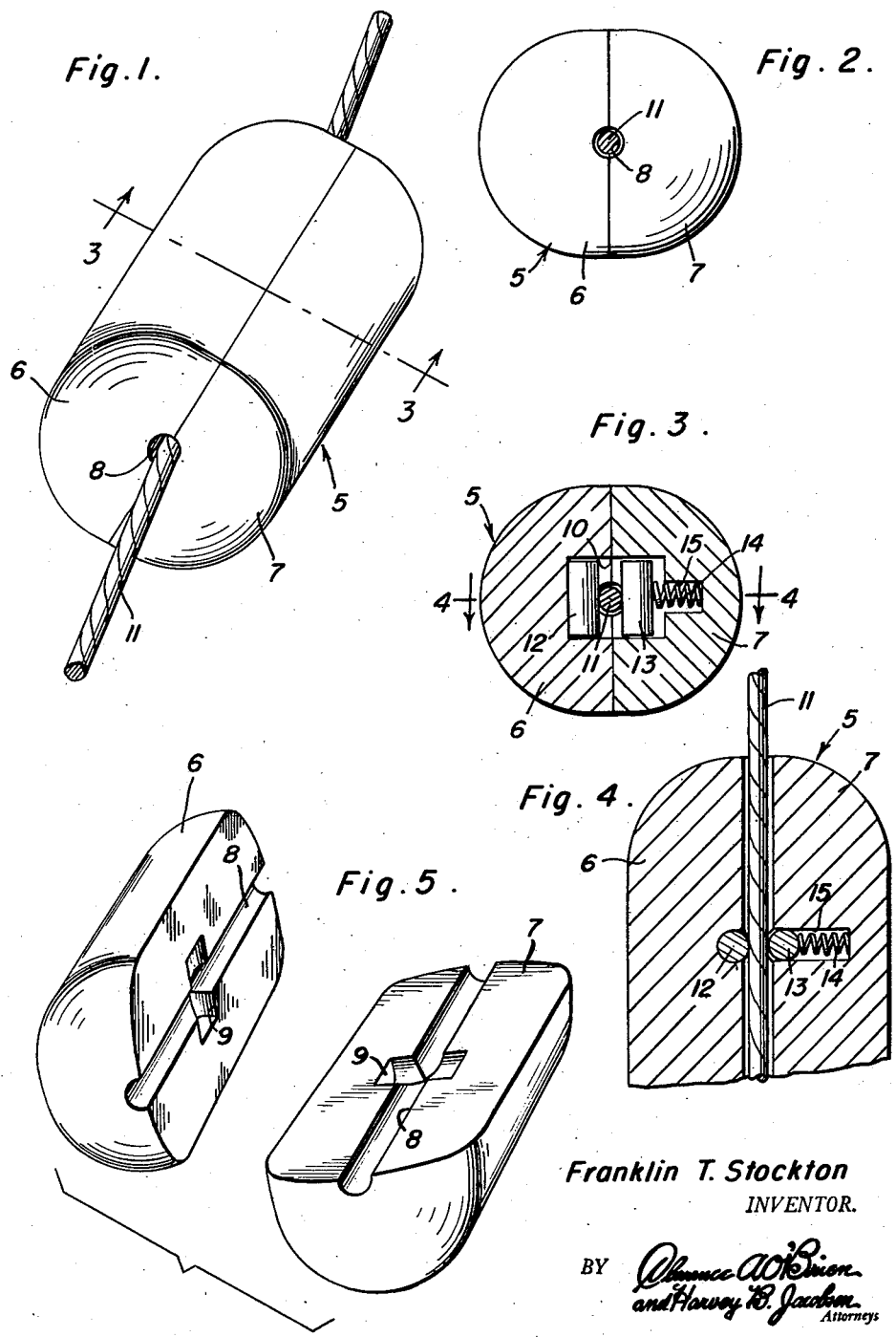
Franklin T. Stockton
INVENTOR.

Sept. 23, 1952 F. T. STOCKTON 2,611,211
FISHING FLOAT

Filed May 17, 1948 2 SHEETS—SHEET 2

Franklin T. Stockton
INVENTOR.

BY Clarence A O'Brien
and Harvey B. Jacobson
Attorneys

Patented Sept. 23, 1952

2,611,211

UNITED STATES PATENT OFFICE 2,611,211

FISHING FLOAT

Franklin T. Stockton, Fort Worth, Tex.

Application May 17, 1948, Serial No. 27,432

2 Claims. (Cl. 43—44.91)

The present invention relates to new and useful improvements in fishing floats and more particularly to means for easily and quickly adjusting the float into a desired position on a fishing line in accordance with a predetermined fishing depth.

An important object of the invention is to provide a fishing float having a line-receiving channel passing therethrough together with means carried internally of the float to frictionally grip and hold the float in a desired position on the line.

A further object of the invention is the provision of a pair of rollers journaled in the float and between which the line passes, together with spring means holding the rollers in clamping engagement with the line, and to otherwise construct the float whereby to reduce wear on the line during frequent adjustments of the float thereon and further to facilitate the sliding of the float on the line when the line is being reeled in.

A still further object is to provide a device of this character of simple and practical construction, which is efficient and reliable in operation, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a perspective view illustrating one embodiment of the invention;

Figure 2 is an end elevational view;

Figure 3 is a transverse sectional view taken on a line 3—3 of Figure 1;

Figure 4 is a fragmentary longitudinal sectional view taken substantially on a line 4—4 of Figure 3;

Figure 5 is a group perspective view of the sections of the float;

Figure 7:
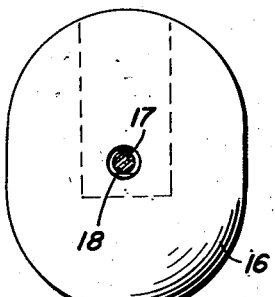
Figure 7 is an end elevational view.
Figure 6:
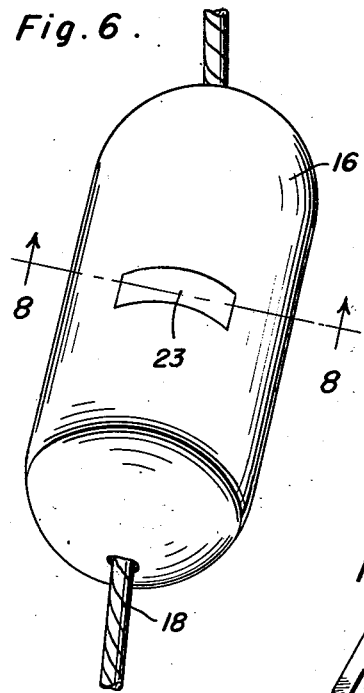
Figure 6 is a perspective view of a modified construction.
Figure 8:
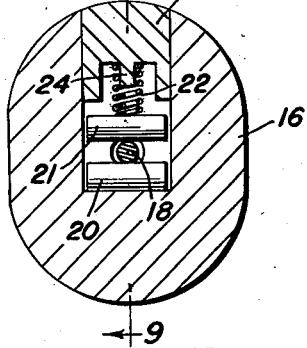
Figure 8 is a transverse sectional view taken substantially on the line 8—8 of Figure 6.
Figure 10:
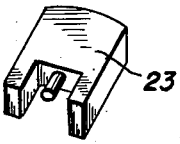
Figure 10 is an enlarged perspective view of the plug for holding the spring and rollers in assembled relation in the plug.

Referring now to the drawings in detail and first with respect to the form of the invention illustrated in Figures 1 to 5, inclusive, the numeral 5 designates the fishing float generally and which is composed of a pair of substantially semi-cylindrical buoyant sections, preferably constructed of balsa wood or other light weight buoyant material and having their flat confronting faces formed with mating line-receiving channels 8 extending longitudinally of the float.

The central portion of the confronting faces of the float sections are formed with matching recesses 9 intersecting the channels 8 to provide a chamber 10 of substantially rectangular shape in cross section when the float sections are secured to each other, as by gluing or other suitable connecting means, in a manner whereby the channels 8 form a bore of a diameter slightly greater than that of a fishing line 11 when passed therethrough whereby to reduce friction and prevent wear of the line by the float.

A pair of rollers 12 and 13 are freely positioned in the recesses 9 at opposite sides of the line 11 and at right angles to the line, the roller 12 being of a diameter when seated in its recess to project into channel 8 to space the line from the walls of the channel as shown more clearly in Figures 3 and 4 of the drawings.

The roller 13 is of a diameter to freely move in its recess 9 and is yieldably held against an opposite side of line 11 by a coil spring 14 positioned in a pocket 15 extending from the adjacent recess 9 and with one end of the spring bearing against the roll 13 to thus clamp the line between the pair of rollers.

In Figures 6 to 11, inclusive, I have illustrated a modified float construction which comprises a solid body 16 of suitable buoyant material and of substantially ovate form in cross section and formed with a longitudinal bore 17 therein through which the line 18 passes.

A substantially rectangular shaped bore defining a chamber 19 is formed in the body 16 to intersect the bore 17, the chamber having a pair of rollers 20 and 21 freely positioned in the chamber in spaced parallel relation with respect to each other and positioned at opposite sides of the line 18, the rollers being constructed and arranged to center the line in the bore.

One end of a coil spring 22 is held against the roller 21 by means of a plug 23 suitably secured in the outer end of chamber 19. The inner end of the plug is formed with a centering pin 24 receiving the adjacent end of spring 22 to hold the spring against displacement, the spring yieldably holding roller 21 in clamping engagement with the line.

Figure 11:
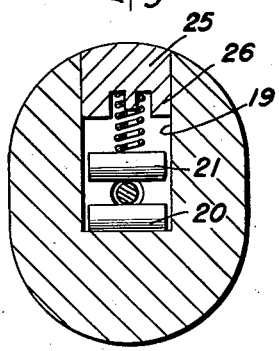
Figure 11 is a transverse sectional view illustrating a modified plug construction.
Figure 9:
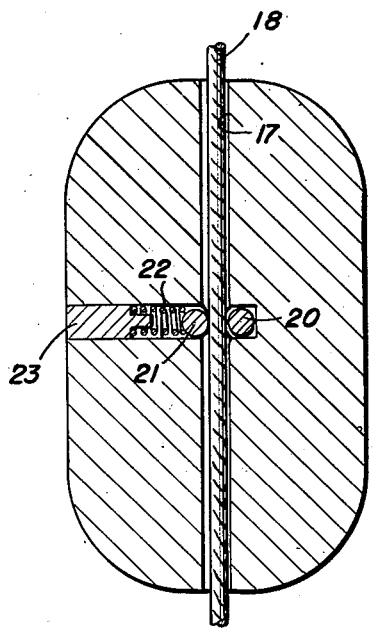
Figure 9 is a longitudinal sectional view taken on a line 9—9 of Figure 8.

In Figure 11, the plug 25 is shown of a slightly modified construction and wherein the side edges 26 are reduced in length.

In the operation of the device, the rollers 12 and 13 and the spring 14 are assembled in the pocket 10 of the sections 6 and 7 of the plug as shown in Figures 1 to 5, inclusive, and permanently enclosed therein, by gluing or otherwise securing the sections of the plug in confronting relation, or the rollers 20 and 21 are assembled in the solid plug 16 as shown in Figures 6 to 11, inclusive, by securing the plug 23 in the outer end of chamber 19.

When inserting the line 11 through the float, a needle or other tool is used to spread the rollers apart and the float is then held in a desired adjusted position on the line by the clamping action of the rollers.

The float may thus be easily and quickly adjusted on the line merely by sliding the same upwardly or downwardly and the rollers will hold the line in its adjusted position.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and within the scope of the appended claims.

Having described the invention, what is claimed as new is:

1. A fishing float comprising a buoyant body having a vertical bore therein to freely receive a fishing line, a lateral bore therein defining a chamber in the body, a pair of rollers loosely positioned in a parallel relation in the chamber at opposite sides of the line, spring means holding the rollers in friction clamping engagement with the line, and a plug closing the chamber and opposing action of the spring means for holding the rollers and spring means in assembled relation in the chamber.

2. A fishing float comprising a buoyant body having a vertical bore therein to freely receive a fishing line, a lateral bore in the body defining a chamber therein, said lateral bore being closed at both ends, a pair of rollers loosely positioned in a parallel relation to each other in the chamber and contacting opposite sides of the line, and spring means in one end of the bore and engaging one of the rollers to hold the line frictionally clamped between both rollers.

FRANKLIN T. STOCKTON.

REFERENCES CITED

The following references are of record in the file of this patent:

UNITED STATES PATENTS

| Number | Name | Date |
| --- | --- | --- |
| 312,400 | Stanford | Feb. 17, 1885 |
| 581,136 | Preece | Apr. 20, 1897 |
| 1,122,359 | Bissett | Dec. 29, 1914 |
| 1,176,631 | Wells | Mar. 21, 1916 |
| 1,259,664 | Peters | Mar. 19, 1918 |
| 1,444,874 | Hahn | Feb. 13, 1923 |
| 1,457,550 | Runkel | June 5, 1923 |
| 1,533,044 | Smith | Apr. 7, 1925 |
| 1,618,851 | Thunberg | Feb. 22, 1927 |
| 2,274,380 | Pool | Feb. 24, 1942 |
| 2,293,294 | Heckman | Aug. 18, 1942 |